(12) United States Patent
Homma

(10) Patent No.: US 12,271,026 B2
(45) Date of Patent: Apr. 8, 2025

(54) RESIN COMPOSITION, OPTICAL FIBER, AND METHOD FOR PRODUCING OPTICAL FIBER

(71) Applicant: SUMITOMO ELECTRIC INDUSTRIES, LTD., Osaka (JP)

(72) Inventor: Yuya Homma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 82 days.

(21) Appl. No.: 17/790,166

(22) PCT Filed: Dec. 8, 2020

(86) PCT No.: PCT/JP2020/045655
§ 371 (c)(1),
(2) Date: Jun. 30, 2022

(87) PCT Pub. No.: WO2021/145102
PCT Pub. Date: Jul. 22, 2021

(65) Prior Publication Data
US 2023/0046664 A1  Feb. 16, 2023

(30) Foreign Application Priority Data

Jan. 14, 2020 (JP) .................................. 2020-003515

(51) Int. Cl.
*G02B 6/02* (2006.01)
*C03C 25/1065* (2018.01)
(Continued)

(52) U.S. Cl.
CPC ...... *G02B 6/02395* (2013.01); *C03C 25/1065* (2013.01); *C03C 25/285* (2013.01);
(Continued)

(58) Field of Classification Search
CPC ............ G02B 6/02395; C03C 25/1065; C03C 25/285; C03C 25/326; C03C 25/6226; C08F 290/067; C09D 151/08
See application file for complete search history.

(56) References Cited

U.S. PATENT DOCUMENTS 5,093,386 A * 3/1992 Bishop ............... C08G 18/4854
522/96
5,373,578 A 12/1994 Parker et al.
(Continued)

FOREIGN PATENT DOCUMENTS

EP  1 347 003 A1  9/2003
JP  S63-085030 A  4/1988
(Continued)

OTHER PUBLICATIONS

The State Intellectual Property Office of People's Republic of China, "The First Office Action", related CN application 2020 80089758, the First Notice of Examination Opinion (PCT) dated Jun. 21, 2023, 8 pages (Year: 2023).*

(Continued)

*Primary Examiner* — Daniel Petkovsek
(74) *Attorney, Agent, or Firm* — Faegre Drinker Biddle & Reath LLP

(57) ABSTRACT

A resin composition for secondary coating of an optical fiber is a resin composition comprising: a photopolymerizable compound comprising a urethane (meth)acrylate having a number average molecular weight of 10000 or more and 40000 or less; and a photopolymerization initiator, the content of the urethane (meth)acrylate is 0.05 parts by mass or more and 15 parts by mass or less based on the total amount of the resin composition of 100 parts by mass, and the urethane (meth)acrylate is a reaction product of a polyol having a number average molecular weight of 1800 or more (Continued)

and 4500 or less, a diisocyanate, and a hydroxyl group-containing (meth)acrylate.

4 Claims, 1 Drawing Sheet

(51) Int. Cl.
  *C03C 25/285* (2018.01)
  *C03C 25/326* (2018.01)
  *C03C 25/6226* (2018.01)
  *C08F 290/06* (2006.01)
  *C09D 151/08* (2006.01)
(52) U.S. Cl.
  CPC ........ *C03C 25/326* (2013.01); *C03C 25/6226* (2013.01); *C08F 290/067* (2013.01); *C09D 151/08* (2013.01)

(56) References Cited

U.S. PATENT DOCUMENTS

| 6,853,788 B2* | 2/2005 | Oshio | C08G 18/4854 385/127 |
| 7,906,566 B2* | 3/2011 | Sugimoto | C08G 18/4854 524/556 |
| 2005/0272829 A1* | 12/2005 | Sugimoto | C08F 283/06 522/178 |
| 2007/0203258 A1 | 8/2007 | Sugimoto et al. | |
| 2012/0321270 A1 | 12/2012 | Imai et al. | |
| 2018/0364437 A1 | 12/2018 | Tachibana et al. | |
| 2018/0372971 A1 | 12/2018 | Terruzzi et al. | |
| 2019/0064433 A1 | 2/2019 | Homma et al. | |
| 2021/0088719 A1 | 3/2021 | Tachibana et al. | |
| 2021/0188705 A1 | 6/2021 | Hamakubo | |
| 2023/0193073 A1 | 6/2023 | Homma | |

FOREIGN PATENT DOCUMENTS

| JP | H07-215737 A | 8/1995 |
| JP | H9-278850 A | 10/1997 |
| JP | H9-328632 A | 12/1997 |
| JP | 2005-089586 A | 4/2005 |
| JP | 2006-036989 A | 2/2006 |
| JP | 2008-247981 A | 10/2008 |
| JP | 2009-514994 A | 4/2009 |
| JP | 2009-227988 A | 10/2009 |
| JP | 2010-510332 A | 4/2010 |
| JP | 2010-235814 A | 10/2010 |
| JP | 2016-194061 A | 11/2016 |
| JP | 2019-007992 A | 1/2019 |
| JP | 2019-040119 A | 3/2019 |
| WO | WO-97/038035 A1 | 10/1997 |
| WO | WO-2005/026228 A1 | 3/2005 |
| WO | WO-2007/050308 A1 | 5/2007 |
| WO | WO-2008/076285 A1 | 6/2008 |
| WO | WO-2009/108056 A1 | 9/2009 |
| WO | WO-2013/077260 A1 | 5/2013 |
| WO | WO-2013/099766 A1 | 7/2013 |
| WO | WO-2017/103655 A1 | 6/2017 |
| WO | WO-2019/026356 A1 | 2/2019 |
| WO | WO-2019/221126 A1 | 11/2019 |
| WO | WO-2020/040223 A1 | 2/2020 |

OTHER PUBLICATIONS

Notice of Allowance mailed Jun. 21, 2024 for U.S. Appl. No. 17/790,181.
Notice of Allowance mailed Sep. 30, 2024 in U.S. Appl. No. 18/010,042.
U.S. Notice of Allowance issued Nov. 20, 2024 in U.S. Appl. No. 17/790,181.

* cited by examiner

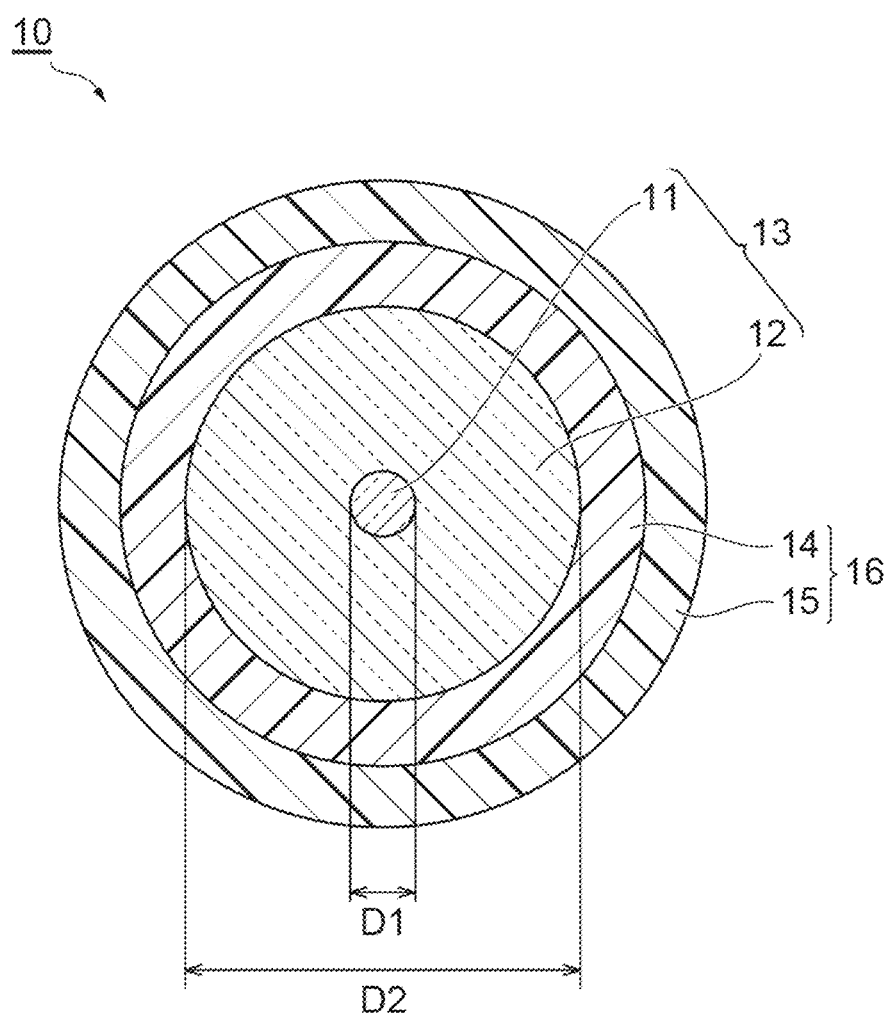

RESIN COMPOSITION, OPTICAL FIBER, AND METHOD FOR PRODUCING OPTICAL FIBER

TECHNICAL FIELD

The present disclosure relates to a resin composition for secondary coating of an optical fiber, an optical fiber, and a method for producing the optical fiber.

The present application claims the priority based on Japanese application No. 2020-003515, filed on Jan. 14, 2020, and the content described in the Japanese application is incorporated herein in its entirety.

BACKGROUND ART

An optical fiber commonly comprises a coating resin layer for protecting a glass fiber that is an optical transmission medium. For example, the coating resin layer comprises two layers that are a primary resin layer in contact with the glass fibers and a secondary resin layer formed on the outer layer of the primary resin layer. The surface slidability, the scratch resistance, the tack preventing property, and the like are required for the secondary resin layer to prevent external damage of the optical fiber and improve the handleability of an optical fiber.

For example, improvement in surface slidability by forming a resin layer using a resin composition containing a silicone compound is disclosed in Patent Literatures 1 and 2. Improvement in a tack preventing property by forming a resin layer using a resin composition containing a specific urethane (meth)acrylate is disclosed in Patent Literatures 3 and 4.

CITATION LIST

Patent Literature

Patent Literature 1: JP H9-278850 A
Patent Literature 2: JP H9-328632 A
Patent Literature 3: JP 2006-36989 A
Patent Literature 4: JP 2005-89586 A

SUMMARY OF INVENTION

A resin composition for secondary coating of an optical fiber according to one aspect of the present disclosure is a resin composition comprising: a photopolymerizable compound comprising a urethane (meth)acrylate having a number average molecular weight of 10000 or more and 40000 or less; and a photopolymerization initiator, the content of the urethane (meth)acrylate is 0.05 parts by mass or more and 15 parts by mass or less based on the total amount of the resin composition of 100 parts by mass, and the urethane (meth)acrylate is a reaction product of a polyol having a number average molecular weight of 1800 or more and 4500 or less, a diisocyanate, and a hydroxyl group-containing (meth)acrylate.

BRIEF DESCRIPTION OF DRAWINGS

FIG. 1 is a schematic sectional view showing one example of an optical fiber according to the present embodiment.

DESCRIPTION OF EMBODIMENTS

[Problem to be Solved by the Present Disclosure]

In production lines of optical fibers, the surface slidability of coating resin layers may deteriorate gradually, and optical fibers may meander when the optical fibers are wound on bobbins, and the productivity of the optical fibers may deteriorate by external forces such as contact with guide rollers and screening tests (tests in which a tensile load of several kilograms is applied to optical fibers, and parts having low strength are removed beforehand). To improve the productivity of optical fibers, a secondary resin layer is required to be excellent in surface slidability and surface abrasion resistance when external force is applied to optical fibers.

An object of the present disclosure is to provide a resin composition for secondary coating of an optical fiber that is excellent in surface slidability and surface abrasion resistance when external force is applied to the optical fiber, and the optical fiber that is excellent in productivity.

[Effects of the Present Disclosure]

According to the present disclosure, the resin composition for secondary coating of an optical fiber that is excellent in surface slidability and surface abrasion resistance when external force is applied to the optical fiber, and the optical fiber that is excellent in productivity can be provided.

[Description of Embodiments of the Present Disclosure]

The contents of the embodiment of the present disclosure are first enumerated and described. The resin composition for secondary coating of an optical fiber according to one aspect of the present disclosure is a resin composition comprising: a photopolymerizable compound comprising a urethane (meth)acrylate having a number average molecular weight of 10000 or more and 40000 or less; and a photopolymerization initiator, the content of the urethane (meth)acrylate is 0.05 parts by mass or more and 15 parts by mass or less based on the total amount of the resin composition of 100 parts by mass, and the urethane (meth)acrylate is a reaction product of a polyol having a number average molecular weight of 1800 or more and 4500 or less, a diisocyanate, and a hydroxyl group-containing (meth)acrylate.

Such a resin composition can form the secondary resin layer that is excellent in surface slidability and surface abrasion resistance when external force is applied to the optical fiber, and the resin composition can therefore improve the productivity of the optical fiber.

Since the surface slidability and the surface abrasion resistance is easily improved, the number average molecular weight of the above-mentioned urethane (meth)acrylate may be 21000 or more and 40000 or less.

Since moderate toughness is imparted to the secondary resin layer, the photopolymerizable compound may further contain a urethane (meth)acrylate having a number average molecular weight of 1000 or more and 6000 or less.

Since more moderate toughness is imparted to the secondary resin layer, the photopolymerizable compound may further contain an epoxy (meth)acrylate. Since the abrasion resistance is further improved, the photopolymerizable compound may contain an epoxy (meth)acrylate having an aromatic ring.

The optical fiber according to one aspect of the present disclosure comprises: a glass fiber including a core and a cladding; a primary resin layer coating the glass fiber in contact with the glass fiber; and a secondary resin layer coating the primary resin layer, and the secondary resin layer contains a cured material of the above-mentioned resin composition. Such an optical fiber is excellent in surface slidability and surface abrasion resistance, and can improve the productivity of the optical fiber.

A method for producing the optical fiber according to one aspect of the present disclosure comprises: an application step of applying the above-mentioned resin composition to the periphery of the glass fiber including the core and the cladding, and a curing step of curing the resin composition by irradiation with ultraviolet rays after the application step. The optical fiber that is excellent in surface slidability and surface abrasion resistance can be produced thereby.

[Details of the Embodiments of the Present Disclosure]

Specific examples of the resin composition and the optical fiber according to the present embodiment will be described with reference to a drawing if needed. The present disclosure is not limited to this exemplification, is shown by the claims, and is intended to include all modifications in meanings and a scope equivalent to the claims. In the following descriptions, the same components are indicated with the same reference numeral, and the same descriptions are omitted in the description of the drawing.

(Resin Composition)

The resin composition according to the present embodiment contains a photopolymerizable compound and a photopolymerization initiator.

The photopolymerizable compound according to the present embodiment contains a urethane (meth)acrylate having a number average molecular weight (Mn) of 10000 or more and 40000 or less (hereinafter referred to as a "urethane (meth)acrylate (A)"). It is preferable that the Mn of the urethane (meth)acrylate (A) be 20000 or more and 40000 or less, and it is more preferable that the Mn be 21000 or more and 40000 or less. If the Mn of the urethane (meth)acrylate (A) is less than 10000, the surface slidability and the surface abrasion resistance tend to decrease, and if the Mn exceeds 40000, the resin composition becomes cloudy easily.

Here, a (meth)acrylate means an acrylate or a methacrylate corresponding thereto. Other similar expressions such as (meth)acrylic acid are in the same way.

The urethane (meth)acrylate (A) is a reaction product of a polyol having an Mn of 1800 or more and 4500 or less, a diisocyanate, and a hydroxyl group-containing (meth)acrylate. The urethane (meth)acrylate (A) has urethane structure based on the reaction of the polyol having an Mn of 1800 or more and 4500 or less and the diisocyanate and (meth)acryloyl groups bound to terminals of the urethane structure.

The polyol and the diisocyanate can be reacted with the molar ratio of the isocyanate groups (NCO) of the diisocyanate to the hydroxyl groups (OH) of the polyol (NCO/OH) adjusted to 1.1 or more and 1.5 or less, and the reaction product can then be reacted with the OH-containing (meth)acrylate to obtain the urethane (meth)acrylate (A). When the NCO/OH is in the above-mentioned range, the proportion of the urethane bonds contained in the urethane (meth)acrylate (A) increases, hydrogen bonds between urethane (meth)acrylate (A) molecules or between urethane (meth)acrylate (A) molecules and other material molecules are therefore strengthened, and good surface properties can be maintained even after external force is applied to the optical fiber.

Since it is easy to synthesize the urethane (meth)acrylate (A) in which the proportion of the urethane bonds is adjusted, the Mn of the polyol constituting the urethane (meth)acrylate (A) is 1800 or more, it is preferable that the Mn be 2000 or more, and it is more preferable that the Mn be 2500 or more. The proportion of the urethane bonds contained in the urethane (meth)acrylate (A) increases, the formation of the secondary resin layer having good surface properties is facilitated, the Mn of the polyol is therefore 4500 or less, it is preferable that the Mn be 4000 or less, and it is more preferable that the Mn be 3500 or less.

The content of the urethane (meth)acrylate (A) is 0.05 parts by mass or more, it is preferable that the content be 0.1 parts by mass or more, it is more preferable that the content be 0.2 parts by mass or more, and it is further preferable that the content be 0.3 parts by mass or more based on the total amount of the resin composition (100 parts by mass) from the viewpoint of improving the surface slidability and the surface abrasion resistance. The content of the urethane (meth)acrylate (A) is 15 parts by mass or less, it is preferable that the content be 10 parts by mass or less, it is preferable that the content be 8 parts by mass or less, and it is further preferable that the content be 5 parts by mass or less based on the total amount of the resin composition from the viewpoint of suppressing a decrease in the Young's modulus of the secondary resin layer.

The photopolymerizable compound according to the present embodiment may further contain a urethane (meth)acrylate having an Mn of 1000 or more and 6000 or less (hereinafter a "urethane (meth)acrylate (B)") from the viewpoint of forming a tough secondary resin layer. It is preferable that the Mn of the urethane (meth)acrylate (B) be 1050 or more and 5800 or less, and it is more preferable that the Mn be 1100 or more and 5500 or less. When the Mn of the urethane (meth)acrylate (B) is 1000 or more, the formation of the tough secondary resin layer is facilitated, and when the Mn is 6000 or less, the enhancement of the Young's modulus of the secondary resin layer is facilitated.

The urethane (meth)acrylate (B) may be a reaction product of a polyol having an Mn of 350 or more and 2500 or less, a diisocyanate, and a hydroxyl group-containing (meth)acrylate. It is preferable that the urethane (meth)acrylate (B) have urethane structure based on the reaction of the polyol having an Mn of 350 or more and 2500 or less and the diisocyanate and (meth)acryloyl groups bound to terminals of the urethane structure.

The polyol having an Mn of 350 or more and 2500 or less and the diisocyanate can be reacted at an NCO/OH of 1.5 or more and 4 or less, and the reaction product can be then reacted with the OH-containing (meth)acrylate to obtain the urethane (meth)acrylate (B). When the NCO/OH is in the above-mentioned range, the formation of the tough secondary resin layer is facilitated.

It is more preferable that the Mn of the polyol constituting the urethane (meth)acrylate (B) be 400 or more and 2200 or less, and it is further preferable that the Mn be 500 or more and 2000 or less from the viewpoint of improving the toughness of the secondary resin layer.

It is preferable that the content of the urethane (meth)acrylate (B) be 5 parts by mass or more and 60 parts by mass or less, and it is more preferable that the content be 10 parts by mass or more and 50 parts by mass or less based on the total amount of the resin composition from the viewpoint of improving the toughness of the secondary resin layer.

Examples of the polyol include polytetramethylene glycol, polyethylene glycol, polypropylene glycol, polyester polyols, polycaprolactone polyols, polycarbonate polyols, polybutadiene polyols, and a bisphenol A-ethylene oxide adduct diol. Especially, it is preferable to use polypropylene glycol as a polyol.

Examples of the diisocyanate include 2,4-tolylene diisocyanate, 2,6-tolylene diisocyanate, isophorone diisocyanate, dicyclohexylmethane diisocyanate, diphenylmethane diisocyanate, hexamethylene diisocyanate, xylylene diisocyanate, hydrogenated xylylene diisocyanate, 1,5-naphthalene diisocyanate, norbornene diisocyanate, 1,5-pentamethylene diisocyanate, tetramethylxylylene diisocyanate, and trimethylhexamethylene diisocyanate.

Examples of the hydroxyl group-containing (meth)acrylate include 2-hydroxyethyl (meth)acrylate, 2-hydroxypropyl (meth)acrylate, 2-hydroxybutyl (meth)acrylate, caprolactone (meth)acrylate, 2-hydroxy-3-phenoxypropyl (meth)acrylate, 2-(meth)acryloyloxyethyl-2-hydroxyethyl phthalic acid, 2-hydroxy-O-phenylphenolpropyl (meth)acrylate, 2-hydroxy-3-methacrylpropyl acrylate, trimethylolpropane di(meth)acrylate, and pentaerythritol tri(meth)acrylate.

An organotin compound or an amine compound is used as a catalyst when a urethane (meth)acrylate is synthesized. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. It is preferable to use dibutyltin dilaurate or dibutyltin diacetate from the viewpoints of availability or catalyst performance as the catalyst.

Hereinafter, the preparation of the urethane (meth)acrylate will be described by giving a specific example. For example, polypropylene glycol is used as the polyol, 2,4-tolylene diisocyanate is used as the diisocyanate, and 2-hydroxyethyl acrylate is used as the hydroxyl group-containing (meth)acrylate. First, 2,4-tolylene diisocyanate is reacted with polypropylene glycol to synthesize an NCO terminal prepolymer. Then, 2-hydroxyethyl acrylate is reacted with the NCO terminal prepolymer to synthesize the urethane acrylate. The urethane acrylate can be represented by the following formula (1):

$$A\text{-}(U\text{—}I\text{—}U\text{—}P)_n\text{—}U\text{—}I\text{—}U\text{-}A \tag{1}$$

wherein A represents a 2-hydroxyethyl acrylate residue, U represents a urethane bond, I represents a 2,4-tolylene diisocyanate residue, P represents a polypropylene glycol residue, and n is an integer of 1 or more. With respect to n, the proportion of urethane bonds which the urethane acrylate has can be varied by changing the NCO/OH. As the NCO/OH becomes lower, n becomes larger, and as the NCO/OH becomes higher, n becomes smaller.

Since moderate toughness is imparted to the secondary resin layer, the photopolymerizable compound according to the present embodiment may further contain an epoxy (meth)acrylate. The epoxy (meth)acrylate is a compound obtained by reacting a compound having a (meth)acryloyl group with an epoxy compound having two or more glycidyl groups.

Since the abrasion resistance is further improved, it is preferable that epoxy (meth)acrylate have an aromatic ring. Examples of the epoxy (meth)acrylate having an aromatic ring include a novolac epoxy (meth)acrylate, the trade name "Viscoat #540" produced by OSAKA ORGANIC CHEMICAL INDUSTRY LTD., and the trade names "EPDXY ESTER 3002M", "EPDXY ESTER 3002A", "EPDXY ESTER 3000MK", and "EPDXY ESTER 3000A" by Kyoeisha Chemical Co., Ltd.

Since flexibility is imparted to the secondary resin layer, the photopolymerizable compound according to the present embodiment may also further contain an epoxy (meth)acrylate not having an aromatic ring. Examples of the epoxy (meth)acrylate not having an aromatic ring include the trade names "EPDXY ESTER 40EM", "EPDXY ESTER 70PA", "EPDXY ESTER 200PA", and "EPDXY ESTER 80MFA" produced by Kyoeisha Chemical Co., Ltd.

The content of the epoxy (meth)acrylate may be 5 parts by mass or more, 10 parts by mass or more, or 20 parts by mass or more, and may be 70 parts by mass or less, 65 parts by mass or less, or 60 parts by mass or less based on the total amount of the resin composition.

The photopolymerizable compound according to the present embodiment may further contain a photopolymerizable compound other than a urethane (meth)acrylate and an epoxy (meth)acrylate (hereinafter referred to as a "monomer"). As the monomer, a monofunctional monomer having one photopolymerizable ethylenic unsaturated group or a polyfunctional monomer having two or more ethylenic unsaturated groups can be used. The monomers may be used as a mixture of two or more.

Examples of the monofunctional monomer include (meth)acrylate-based monomers such as methyl (meth)acrylate, ethyl (meth)acrylate, propyl (meth)acrylate, n-butyl (meth)acrylate, s-butyl (meth)acrylate, t-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, phenoxyethyl (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate (for example, the trade name "SR504" produced by Sartomer), nonylphenoxypolyethylene glycol (meth)acrylate, isobornyl (meth)acrylate, 3-phenoxybenzyl (meth)acrylate, methylphenoxy ethyl (meth)acrylate, phenoxydiethylene glycol (meth)acrylate, phenoxypolyethylene glycol (meth)acrylate, m-phenoxybenzyl (meth)acrylate, 2-(2-ethoxyethoxy)ethyl (meth)acrylate, and 2-hydroxy-3-phenoxypropyl acrylate; carboxyl group-containing monomers such as (meth)acrylic acid, (meth)acrylic acid dimers, carboxyethyl (meth)acrylate, carboxypentyl (meth)acrylate, and ω-carboxypolycaprolactone (meth)acrylate; and nitrogen-containing monomers such as N-acryloyl morpholine, N-vinyl pyrrolidone, N-vinylcaprolactam, 3-(3-pyridinyl) propyl (meth)acrylate, N,N-dimethylacrylamide, N-hydroxyethylacrylamide, N,N-diethylacrylamide, N-isopropylacrylamide, N,N-dimethylaminopropyl acryl amide, N,N-dimethylaminopropylacrylamide-methyl chloride salt, diacetone acrylamide, N-acryloylpiperidine, N-methacryloylpiperidine, N-acryloylpyrrolidine, maleimide, N-cyclohexylmaleimide, N-phenylmaleimide, (meth)acrylamide, N,N-dimethyl(meth)acrylamide, N-hexyl(meth)acrylamide, N-methyl(meth)acrylamide, N-butyl(meth)acrylamide, N-methylol(meth)acrylamide, N-methylolpropane(meth)acrylamide, aminoethyl (meth)acrylate, aminopropyl (meth)acrylate, N,N-dimethylaminoethyl (meth)acrylate, and t-butylaminoethyl (meth)acrylate.

Examples of the polyfunctional monomer include difunctional monomers such as ethylene glycol di(meth)acrylate, polyethylene glycol di(meth)acrylate, polypropylene glycol di(meth)acrylate, neopentyl glycol di(meth)acrylate, tripropylene glycol di(meth)acrylate, triethylene glycol di(meth)acrylate, cyclohexanedimethanol di(meth)acrylate, dipropylene glycol di(meth)acrylate, tetraethylene glycol di(meth)acrylate, hydroxypivalate neopentyl glycol di(meth)acrylate, 1,3-butylene glycol di(meth)acrylate, 1,4-butanediol di(meth)acrylate, diethylene glycol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-haxadecanediol di(meth)acrylate, 1,20-eicosanediol di(meth)acrylate, isopentyldiol di(meth)acrylate, 3-ethyl-1,8-octanediol di(meth)acrylate, tricyclodecanol di(meth)acrylate, 9,9-bis[4-(2-hydroxyethoxy)phenyl]fluorene di(meth)acrylate, and bisphenol A-ethylene oxide adduct di(meth)acrylate (for example, the trade name "Viscoat #700HV" produced by OSAKA ORGANIC CHEMICAL INDUSTRY LTD.); and tri- or more functional monomers such as trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl] isocyanurate.

The photopolymerization initiator can be suitably selected from well-known radical photopolymerization initiators and used. Examples of the photopolymerization initiator include 1-hydroxycyclohexyl phenyl ketone (Omnirad 184, produced by IGM Resins B.V.), 2,2-dimethoxy-2-phenyl acetophenone (Omnirad 651, produced by IGM Resins B.V.), 2,4,6-trimethylbenzoyl diphenylphosphine oxide (Omnirad TPO, produced by IGM Resins B.V.), ethyl(2,4,6-trimethylbenzoyl)-phenyl phosphinate (Omnirad TPO-L, produced by IGM Resins B.V.), 2-benzoyl-2-dimethylamino-4'-morpholinobutyrophenone (Omnirad TP0369, produced by IGM Resins B.V.), 2-dimethylamino-2-(4-methylbenzyl)-1-(4-morpholin-4-yl-phenyl)-butan-1-one (Omnirad TPO 379, produced by IGM Resins B.V.), bis(2,4,6-trimethylbenzoyl) phenylphosphine oxide (Omnirad 819, produced by IGM Resins B.V.), and 2-methyl-1-[4-(methylthio)phenyl]-2-morpholinopropan-1-one (Omnirad 907, produced by IGM Resins B.V.).

The photopolymerization initiator may be used as a mixture of two or more. It is preferable due to excellent rapid curability of the resin composition that the photopolymerization initiator contain 2,4,6-trimethylbenzoyldiphenylphosphine oxide.

It is preferable that the content of the photopolymerization initiator be 0.2 parts by mass or more and 5 parts by mass or less, it is more preferable that the content be 0.4 parts by mass or more and 3 parts by mass or less, and it is further preferable that the content be 0.5 parts by mass or more and 2 parts by mass or less based on the total amount of the resin composition.

The resin composition according to the present embodiment may further contain a photoacid generator, a leveling agent, an antifoaming agent, an antioxidant, and the like.

An onium salt having a structure of $A^+B^-$ may be used as the photoacid generator. Examples of the photoacid generator include sulfonium salts such as CPI-100P and 110P (produced by San-Apro Ltd.) and Omnicat 270 and 290 (produced by IGM Resins B.V.); and iodonium salts such as Omnicat 250 (produced by IGM Resins B.V.), WPI-113,116, 124, 169, and 170 (produced by FUJIFILM Wako Pure Chemical Corporation).

(Optical Fiber)

FIG. 1 is a schematic sectional view showing one example of the optical fiber according to the present embodiment. An optical fiber 10 comprises a glass fiber 13 including a core 11 and a cladding 12 and a coating resin layer 16 including a primary resin layer 14 and a secondary resin layer 15 provided on the periphery of the glass fiber 13.

The cladding 12 surrounds the core 11. The core 11 and the cladding 12 mainly contain glass such as silica glass, and for example, germanium-added silica glass or pure silica glass can be used for the core 11, and pure silica glass or fluorine-added silica glass can be used for the cladding 12.

In FIG. 1, for example, the outer diameter of the glass fiber 13 (D2) is around 100 μm to 125 μm. The diameter of the core 11 (D1), constituting the glass fiber 13, is around 7 μm to 15 μm.

The thickness of the coating resin layer 16 is usually around 60 μm to 70 μm. The thickness of each layer of the primary resin layer 14 and the secondary resin layer 15 may be around 20 μm to 40 μm, and for example, the thickness of the primary resin layer 14 may be 35 μm, and the thickness of the secondary resin layer 15 may be 25 μm. When many optical fibers are gathered to form a cable, it is preferable that the coating diameter of an optical fiber be small. In that case, it is preferable that the total thickness of the coating resin layer 16 be 30 μm or more and 40 μm or less, and the thickness of the primary resin layer and the secondary resin layer can each be 10 μm or more and 30 μm or less.

The resin composition according to the present embodiment can be applied to the secondary resin layer to produce an optical fiber that is excellent in productivity.

The method for producing the optical fiber according to the present embodiment comprises: an application step of applying the above-mentioned resin composition to the periphery of the glass fiber including the core and the cladding; and a curing step of curing the resin composition by irradiation with ultraviolet rays after the application step.

It is preferable that the Young's modulus of the secondary resin layer be 500 MPa or more at 23° C. ±2° C., and it is more preferable that the Young's modulus be 800 MPa or more from the viewpoint of improving the microbending resistance of the optical fiber. Although the upper limit of the Young's modulus of the secondary resin layer is not particularly limited, the upper limit may be 3000 MPa or less, 2500 MPa or less, 2000 MPa or less, or 1500 MPa or less at 23° C. ±2° C. from the viewpoint of imparting moderate toughness to the secondary resin layer.

The Young's modulus of the secondary resin layer can be measured by the following method. First, the optical fiber is immersed in a mixed solvent of acetone and ethanol, and only the coating resin layer is extracted in a cylindrical shape. Although the primary resin layer and the secondary resin layer are united at this time, the Young's modulus of the primary resin layer is 1/1000 to 1/10000 of the Young's modulus of the secondary resin layer, the Young's modulus of the primary resin layer is therefore negligible. Next, the solvent is removed from the coating resin layer by vacuum drying, a tensile test (the tensile speed is 1 mm/minute) can be performed at 23° C., and the Young's modulus can be calculated by a secant expression at 2.5% strain.

The resin composition containing, for example, the urethane (meth)acrylate, the monomer, the photopolymerization initiator, and the like can be cured to form the primary resin layer 14. The resin composition that forms the primary resin layer has a constitution different from the resin composition for secondary coating. The resin composition for the primary coating can be prepared using a conventionally well-known technique.

It is preferable that the Young's modulus of the primary resin layer be 0.5 MPa or less. When the Young's modulus of the primary resin layer exceeds 0.5 MPa, external force is easily transmitted to the glass fiber, and the transmission loss increase due to microbending may rise.

A plurality of optical fibers may be paralleled and integrated with a resin for a ribbon to form an optical fiber ribbon. The resin composition according to the present disclosure can also be used as the resin for a ribbon. The surface slidability and the surface abrasion resistance when external force is applied to the optical fiber ribbon can be improved thereby in the same way as the optical fiber.

EXAMPLES

Hereinafter, the results of evaluation tests using Examples and Comparative Examples according to the present disclosure will be shown, and the present disclosure will be described in further detail. The present invention is not limited to these Examples.

[Synthesis of Urethane Acrylate]

(A-1)

Polypropylene glycol having an Mn of 4000 (PPG4000) and 2,4-tolylene diisocyanate (TDI) were reacted at 80° C. for 1 hour with the molar ratio of NCO to OH (NCO/OH) adjusted to 1.5 to prepare an NCO terminal prepolymer. As a catalyst, 200 ppm dibutyltin dilaurate was added with respect to the final total fed amount. Next, 2-hydroxyethyl acrylate (HEA) was added so that the molar ratio of the OH of HEA to the NCO of the NCO terminal prepolymer was 1.05, and the mixture was reacted at 80° C. for 1 hour to obtain a urethane acrylate having an Mn of (A-1)

(A-2)

A urethane acrylate having an Mn of 17300 (A-2) was obtained in the same way as in the synthesis of (A-1) except that polypropylene glycol having an Mn of 2000 (PPG2000) and TDI were reacted at an NCO/OH of 1.2 to prepare an NCO terminal prepolymer.

(A-3)

A urethane acrylate having an Mn of 21500 (A-3) was obtained in the same way as in the synthesis of (A-1) except that polypropylene glycol having an Mn of 3000 (PPG3000) and TDI were reacted at an NCO/OH of 1.2 to prepare an NCO terminal prepolymer.

(A-4)

A urethane acrylate having an Mn of 38700 (A-4) was obtained in the same way as in the synthesis of (A-1) except that PPG3000 and TDI were reacted at an NCO/OH of 1.1 to prepare an NCO terminal prepolymer.

(B-1)

A urethane acrylate having an Mn of 1900 (B-1) was obtained in the same way as in the synthesis of (A-1) except that polypropylene glycol having an Mn of 400 (PPG400) and isophorone diisocyanate (IPDI) were reacted at an NCO/OH of 1.5 to prepare an NCO terminal prepolymer.

(B-2)

A urethane acrylate having an Mn of 2200 (B-2) was obtained in the same way as in the synthesis of (A-1) except that polypropylene glycol having an Mn of 600 (PPG600) and TDI were reacted at an NCO/OH of 2.0 to prepare an NCO terminal prepolymer.

(B-3)

A urethane acrylate having an Mn of 1100 (B-3) was obtained in the same way as in the synthesis of (A-1) except that PPG400 and TDI were reacted at an NCO/OH of 4.0 to prepare an NCO terminal prepolymer.

(B-4)

A urethane acrylate having an Mn of 5400 (B-4) was obtained in the same way as in the synthesis of (A-1) except that PPG2000 and TDI were reacted at an NCO/OH of 2.0 to prepare an NCO terminal prepolymer.

(Z-1)

A urethane acrylate having an Mn of 8200 (Z-1) was obtained in the same way as in the synthesis of (A-1) except that PPG3000 and TDI were reacted at an NCO/OH of 2.0 to prepare an NCO terminal prepolymer.

(Z-2)

A urethane acrylate having an Mn of 10800 (Z-2) was obtained in the same way as in the synthesis of (A-1) except that PPG3000 and IPDI were reacted at an NCO/OH of 1.5 to prepare an NCO terminal prepolymer.

The Mn of the urethane acrylate was measured using an ACQUITY APC RI system manufactured by Nihon Waters K.K. under the conditions of sample concentration: 0.2% by mass THF solution, injection rate: 20 µL, sample temperature: 15° C., mobile phase: THF, XT columns for organic solvent: particle size 2.5 µm, pore size 450 A, column inner diameter 4.6×column length 150 mm+particle size 2.5 µm, pore size 125 Å, column inner diameter 4.6×column length 150 mm+particle size 1.7 µm, pore size 45 Å, column inner diameter 4.6×column length 150 mm, column temperature: 40° C., and flow velocity: 0.8 mL/minute.

[Resin Composition for Secondary Coating]

Urethane acrylates, tripropylene glycol diacrylate (TPGDA), neopentyl glycol diacrylate (NPGDA), bisphenol A-ethylene oxide adduct diacrylate (Viscoat #700HV), an epoxy acrylate having an aromatic ring (Viscoat #540), an epoxy acrylate not having an aromatic ring (EPDXY ESTER 200PA), and 2,4,6-trimethylbenzoyl diphenylphosphine oxide (Omnirad TPO) were mixed in blended amounts (part by mass) shown in Table 1 or Table 2 to prepare resin compositions for secondary coatings of Examples and Comparative Examples. However, the resin composition of Comparative Example 2 was cloudy, and could not be used for forming a secondary resin layer.

(Resin Composition for Primary Coating)

First, 70 parts by mass of the urethane acrylate (Z-2), 19 parts by mass of nonylphenol polyethylene glycol acrylate (produced by Sartomer, the trade name "SR504"), 10 parts by mass of isobornyl acrylate, and 1 part by mass of Omnirad TPO were mixed to obtain a resin composition for a primary coating.

[Production of Optical Fiber]

The resin composition for a primary coating and each resin composition for secondary coating were each applied to the peripheral surface of the glass fiber 13. Subsequently, the resin compositions were cured by irradiation with ultraviolet rays, the coating resin layer 16 comprising the primary resin layer 14 and the secondary resin layer 15 was formed to produce the optical fiber 10. The thickness of the primary resin layer 14 was adjusted to 35 µm, and the thickness of the secondary resin layer 15 was adjusted to 25 µm.

(Young's Modulus of Secondary Resin Layer)

The optical fiber is immersed in a mixed solvent of acetone and ethanol, and only the coating resin layer is extracted in a cylindrical shape. Next, the solvent is removed from the coating resin layer by vacuum drying, a tensile test (the tensile speed is 1 mm/minute) can be then performed in a thermostatic chamber at 23° C., and the Young's modulus of the secondary resin layer was calculated by dividing stress calculated by a secant expression at 2.5% strain by the cross section of the secondary resin layer. If the Young's modulus was 500 MPa or more, the optical fiber was regarded as acceptable.

(Winding Abnormality Frequency of Optical Fiber)

To evaluate the productivity of the optical fiber, the winding abnormality frequency was measured. First, 500 kin of the optical fiber was wound at a linear velocity of 1000 m/minute (50 km×10 bobbins), and the transmission loss of the optical fiber of each bobbin in the longitudinal direction was evaluated using an OTDR (optical time domain reflectometer). The measurement wavelength was 1550 nm. An optical fiber in which points at which the Point Discontinuities exceed 0.05 dB (winding abnormality frequency) were 5 points or less/500 km was regarded as acceptable.

TABLE 1

|  | Example 1 | Example 2 | Example 3 | Example 4 | Example 5 | Example 6 | Example 7 | Example 8 |
|---|---|---|---|---|---|---|---|---|
| A-1 | 1 | — | — | — | — | — | — | — |
| A-2 | — | 1 | — | — | — | — | — | — |
| A-3 | — | — | 1 | — | 0.1 | 0.3 | 5 | 10 |
| A-4 | — | — | — | 1 | — | — | — | — |
| B-2 | 35 | 35 | 35 | 35 | 35 | 35 | 35 | 35 |
| TPGDA | 23 | 23 | 23 | 23 | 23.9 | 23.7 | 19 | 34 |
| NPGDA | 20 | 20 | 20 | 20 | 20 | 20 | 20 | — |
| Viscoat #540 | 20 | 20 | 20 | 20 | 20 | 20 | 20 | 20 |
| Omnirad TPO | 1 | 1 | 1 | 1 | 1 | 1 | 1 | 1 |
| Young's modulus (MPa) | 1160 | 1160 | 1140 | 1130 | 1140 | 1140 | 990 | 750 |
| Winding abnormality frequency | 3 | 3 | 1 | 1 | 5 | 4 | 1 | 3 |

TABLE 2

|  | Example 9 | Example 10 | Example 11 | Example 12 | Comparative Example 1 | Comparative Example 2 | Comparative Example 3 |
|---|---|---|---|---|---|---|---|
| A-3 | 1 | 1 | 1 | 1 | — | 20 | — |
| B-1 | — | 50 | — | — | — | — | — |
| B-2 | — | — | — | — | 35 | 35 | 35 |
| B-3 | 35 | — | — | — | — | — | — |
| B-4 | — | — | 10 | — | — | — | — |
| Z-1 | — | — | — | — | — | — | 1 |
| TPGDA | 23 | 18 | 28 | 18 | 24 | 24 | 23 |
| NPGDA | 15 | — | — | — | 20 | — | 20 |
| Viscoat #700HV | — | — | — | 20 | — | — | — |
| Viscoat #540 | 20 | 10 | 50 | 60 | 20 | 20 | 20 |
| EPOXY ESTER 200PA | 5 | 20 | 10 | — | — | — | — |
| Omnirad TPO | 1 | 1 | 1 | 1 | 1 | 1 | 1 |
| Young's modulus (MPa) | 1180 | 1310 | 1080 | 1250 | 1160 | — | 1160 |
| Winding abnormality frequency | 0 | 0 | 0 | 3 | 22 | — | 14 |

REFERENCE SIGNS LIST

10: Optical Fiber
11: Core
12: Cladding
13: Glass Fiber
14: Primary Resin Layer
15: Secondary Resin Layer
16: Coating Resin Layer

The invention claimed is:

1. A resin composition for secondary coating of an optical fiber, comprising:
   a photopolymerizable compound comprising a urethane (meth)acrylate (A) having a number average molecular weight of 21000 or more and 40000 or less, a urethane (meth)acrylate (B) having a number average molecular weight of 1000 or more and 6000 or less, and an epoxy (meth)acrylate; and
   a photopolymerization initiator,
   wherein a content of the urethane (meth)acrylate (A) is 0.05 parts by mass or more and 15 parts by mass or less based on a total amount of the resin composition of 100 parts by mass, and
   the urethane (meth)acrylate (A) is a reaction product of a polyol having a number average molecular weight of 1800 or more and 4500 or less, a diisocyanate, and a hydroxyl group-containing (meth)acrylate.

2. The resin composition accordingly to claim 1, wherein the photopolymerizable compound comprises an epoxy (meth)acrylate having an aromatic ring.

3. An optical fiber, comprising:
   a glass fiber comprising a core and a cladding;
   a primary resin layer coating the glass fiber in contact with the glass fiber; and
   a secondary resin layer coating the primary resin layer, wherein the secondary resin layer comprises a cured material of the resin composition according to claim 1.

4. A method for producing an optical fiber, comprising:

providing a resin composition for secondary coating of the optical fiber, the resin composition comprising a photopolymerizable compound comprising a urethane (meth)acrylate (A) having a number average molecular weight of 21000 or more and 40000 or less, a urethane (meth)acrylate (B) having a number average molecular weight of 1000 or more and 6000 or less, and an epoxy (meth)acrylate; and a photopolymerization initiator, wherein a content of the urethane (meth)acrylate (A) is 0.05 parts by mass or more and 15 parts by mass or less based on a total amount of the resin composition of 100 parts by mass, and the urethane (meth)acrylate (A) is a reaction product of a polyol having a number average molecular weight of 1800 or more and 4500 or less, a diisocyanate, and a hydroxyl group-containing (meth)acrylate;

after applying a primary coating, an application step of applying the resin composition to a periphery of a glass fiber comprising a core and a cladding; and a curing step of curing the resin composition by irradiation with ultraviolet rays after the application step.

\* \* \* \* \*